US012615163B2

(12) United States Patent
Lavid Ben Lolo et al.

(10) Patent No.: US 12,615,163 B2
(45) Date of Patent: Apr. 28, 2026

(54) SYSTEM AND METHOD FOR MACHINE LEARNING BASED SECURITY INCIDENTS DETECTION AND CLASSIFICATION IN A BLOCKCHAIN ECOSYSTEM

(71) Applicant: Cyvers.AI Ltd., Yoqneam Ilit (IL)

(72) Inventors: Deddy Lavid Ben Lolo, Yoqneam (IL); Meir Badalov Dolev, Modiin (IL)

(73) Assignee: Cyvers.AI Ltd., Yoqneam Ilit (IL)

( * ) Notice: Subject to any disclaimer, the term of this patent is extended or adjusted under 35 U.S.C. 154(b) by 52 days.

(21) Appl. No.: 18/405,460

(22) Filed: Jan. 5, 2024

(65) Prior Publication Data

US 2024/0235861 A1 Jul. 11, 2024

Related U.S. Application Data

(60) Provisional application No. 63/479,094, filed on Jan. 9, 2023.

(51) Int. Cl.
*H04L 9/00* (2022.01)
*G06F 21/55* (2013.01)

(52) U.S. Cl.
CPC .............. *H04L 9/50* (2022.05); *G06F 21/554* (2013.01)

(58) Field of Classification Search
None
See application file for complete search history.

(56) References Cited

U.S. PATENT DOCUMENTS

| | | | |
|---|---|---|---|
| 11,081,219 B1 * | 8/2021 | Dods | G06F 18/22 |
| 2018/0219888 A1 * | 8/2018 | Apostolopoulos | |
| | | | H04L 63/1425 |

| | | | |
|---|---|---|---|
| 2019/0379642 A1 * | 12/2019 | Simons | H04L 63/0281 |
| 2021/0133670 A1 * | 5/2021 | Cella | G06N 3/044 |
| 2021/0248514 A1 * | 8/2021 | Cella | G06V 20/20 |
| 2022/0197306 A1 * | 6/2022 | Cella | H04L 63/1441 |
| 2023/0325814 A1 * | 10/2023 | Vijayan | G06Q 20/3829 |
| | | | 705/66 |
| 2023/0421377 A1 * | 12/2023 | Jakobsson | H04L 9/50 |
| 2024/0161108 A1 * | 5/2024 | Madisetti | G06F 16/9024 |

OTHER PUBLICATIONS

Patel et al. "Graph Deep Learning Based Anomaly Detection in Ethereum Blockchain Network", Springer, NSS 2020, pp. 132-148. ( Year: 2020).*

* cited by examiner

*Primary Examiner* — Kaveh Abrishamkar
(74) *Attorney, Agent, or Firm* — M&B IP Analysts, LLC

(57) ABSTRACT

On-chain data as well as off-chain data for a blockchain ecosystem is collected by a management server. The management server generates a cross-chain graph representation based on the collected on-chain and off-chain data. The cross-chain graph representation includes a plurality of nodes representing blockchain addresses and a plurality of edges representing transactions made between at least a portion of the plurality of nodes. The management server applies one or more machine learning (ML) models to the cross-chain graph representation to detect suspicious anomalies in the cross-chain graph representation. Upon determination that one or more suspicious anomalies have been detected in the cross-chain graph representation above a dynamic model-based threshold value, an alert indicating a security incident may be generated. In addition, a supervised ML model may be applied to the cross-chain graph representation for classifying the type of the security incident.

20 Claims, 7 Drawing Sheets

100

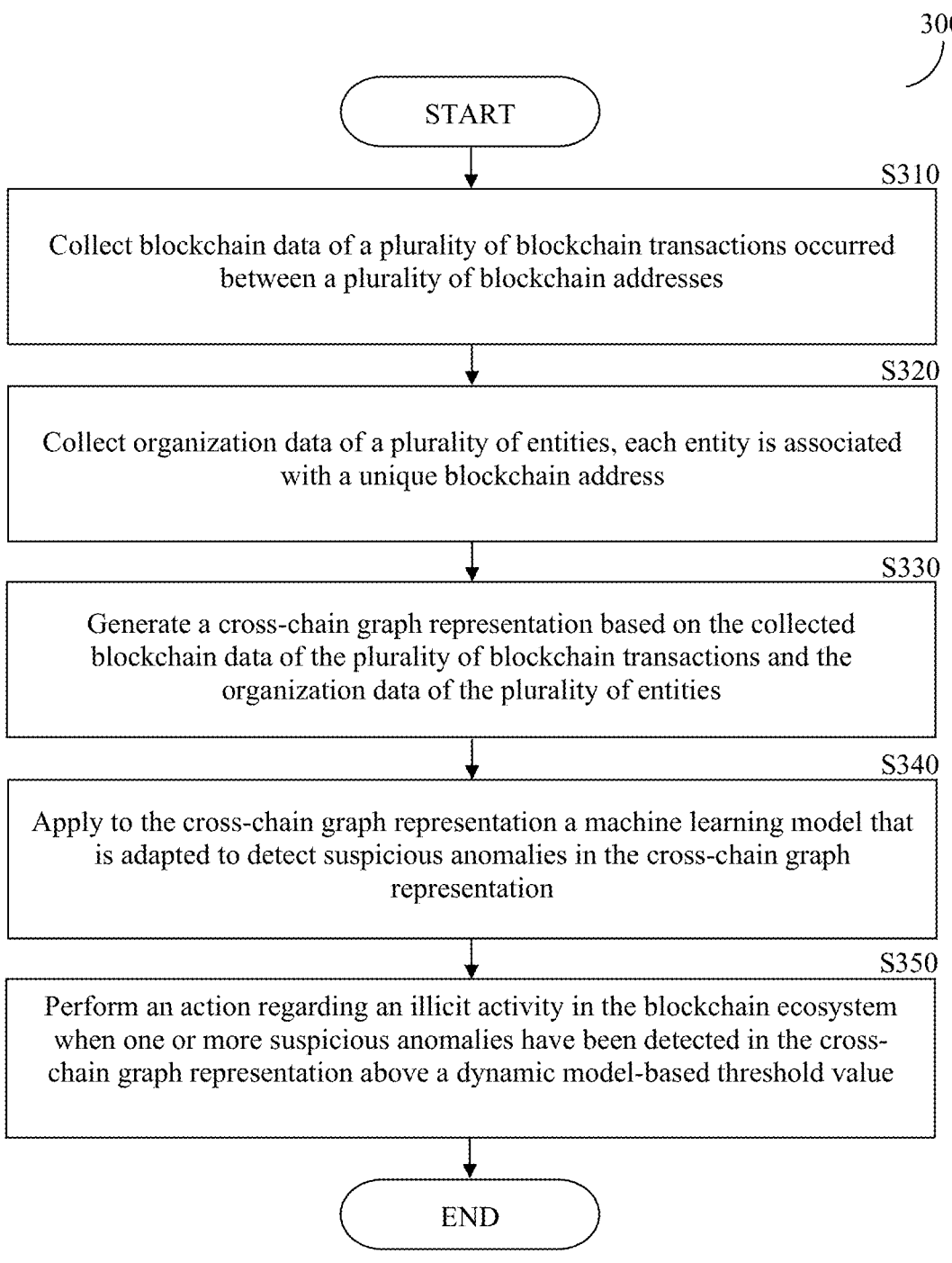

300

START

S310

Collect blockchain data of a plurality of blockchain transactions occurred between a plurality of blockchain addresses

S320

Collect organization data of a plurality of entities, each entity is associated with a unique blockchain address

S330

Generate a cross-chain graph representation based on the collected blockchain data of the plurality of blockchain transactions and the organization data of the plurality of entities

S340

Apply to the cross-chain graph representation a machine learning model that is adapted to detect suspicious anomalies in the cross-chain graph representation

S350

Perform an action regarding an illicit activity in the blockchain ecosystem when one or more suspicious anomalies have been detected in the cross-chain graph representation above a dynamic model-based threshold value

END

FIG. 3

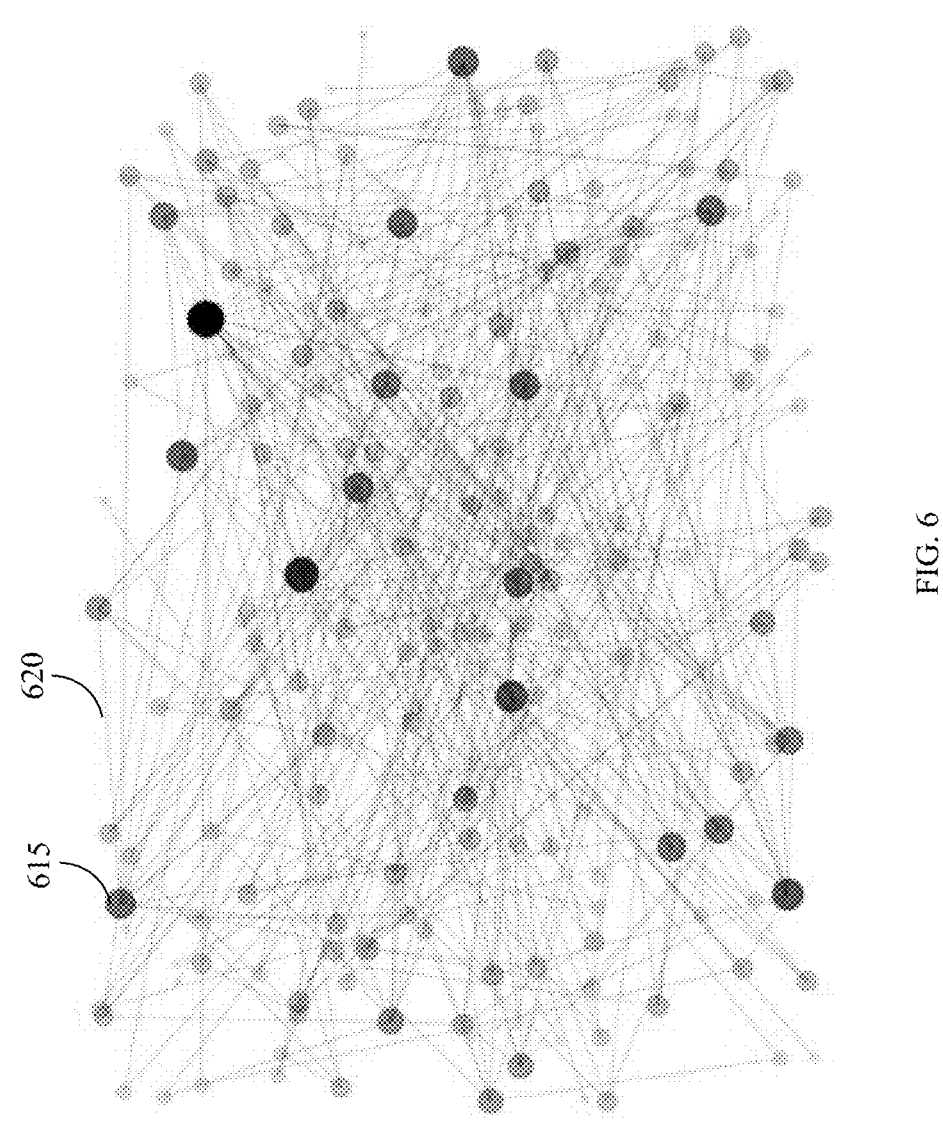
FIG. 6

SYSTEM AND METHOD FOR MACHINE LEARNING BASED SECURITY INCIDENTS DETECTION AND CLASSIFICATION IN A BLOCKCHAIN ECOSYSTEM

CROSS REFERENCE TO RELATED APPLICATIONS

This application claims the benefit of U.S. Provisional Application No. 63/479,094 filed on Jan. 9, 2023, the contents of which are hereby incorporated by reference.

TECHNICAL FIELD

The disclosure generally relates to blockchain, and more particularly, to blockchain security.

BACKGROUND

A blockchain is a type of distributed ledger utilized in several areas such as digital currencies, smart contracts, financial or data transfer transactions, authenticated record management and the like.

The blockchain stores information electronically in digital format. Blockchains are best known for their crucial role in cryptocurrency systems for maintaining a secure and decentralized record of transactions. The blockchain technology guarantees the fidelity and security of a record of data and generates trust without the need for a trusted third party.

Smart contracts are programs stored on a blockchain typically used to automate the execution of an agreement so that all counterparties can be sure of the outcome without the need to trust one another or any intermediaries. Furthermore, a smart contract guarantees that its execution will correspond precisely to the initial written logic. And after the implementation of a predetermined logic, the final state on the blockchain will stay immutable. However, the correct execution of a smart contract code cannot guarantee its complete safety. Analysis of existing smart contracts shows that many of them are vulnerable to malicious activity.

On one hand, smart contracts platforms' programmability allows its users to implement processes of varying complexity, but on the other hand, the programmability also makes the smart contracts platform more vulnerable to cyberattacks and illicit activity. Therefore, it would be advantageous to provide a solution that overcomes the shortcomings of prior art solutions noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for real-time detection of security incidents in a blockchain ecosystem. The method comprises: collecting, by a management server, from one on more electronic sources on-chain data of a plurality of blockchain transactions occurred between a plurality of blockchain addresses; collecting, by the management server, off-chain data of a plurality of entities, wherein each entity of the plurality of entities is associated with at least one blockchain transaction of the plurality of blockchain transactions; generating, by the management server, a cross-chain graph representation based on at least the collected on-chain data of the plurality of blockchain transactions and the off-chain data of the plurality of entities, wherein the cross-chain graph representation includes a plurality of nodes representing blockchain addresses and a plurality of edges representing connections between at least a portion of the plurality of nodes; applying, by the management server, to the cross-chain graph representation a machine learning model that is adapted to detect suspicious anomalies in the cross-chain graph representation; and when one or more suspicious anomalies have been detected above a dynamic model-based threshold value in the cross-chain graph representation, instigating, in real-time, the taking of an action regarding detection of a security incident.

Certain embodiments disclosed include a system for real-time detection of illicit activity in a blockchain environment, comprising: a processing circuitry; and a memory, the memory containing instructions that, when executed by the processing circuitry, configure the system to: collect from one on more electronic sources on-chain data of a plurality of blockchain transactions occurred between a plurality of blockchain addresses; collect off-chain data of a plurality of entities, wherein each entity of the plurality of entities is associated with at least one blockchain transaction of the plurality of blockchain transactions; generate a cross-chain graph representation based on at least the collected on-chain data of the plurality of blockchain transactions and the off-chain data of the plurality of entities, wherein the cross-chain graph representation includes a plurality of nodes representing blockchain addresses and a plurality of edges representing connections between at least a portion of the plurality of nodes; apply to the cross-chain graph representation a machine learning model that is adapted to detect suspicious anomalies in the cross-chain graph representation; and when one or more suspicious anomalies have been detected above a dynamic model-based threshold value in the cross-chain graph representation, instigate, in real-time, the taking of an action regarding detection of a security incident.

BRIEF DESCRIPTION OF THE DRAWING

In the drawing:

FIG. 3 is a flowchart illustrating an illustrative method for detecting security incidents in blockchain ecosystem, according to an embodiment;

FIG. 6 is an illustrative diagram illustrating a graph representation of a blockchain ecosystem, according to an embodiment.

DETAILED DESCRIPTION

Figure 1:
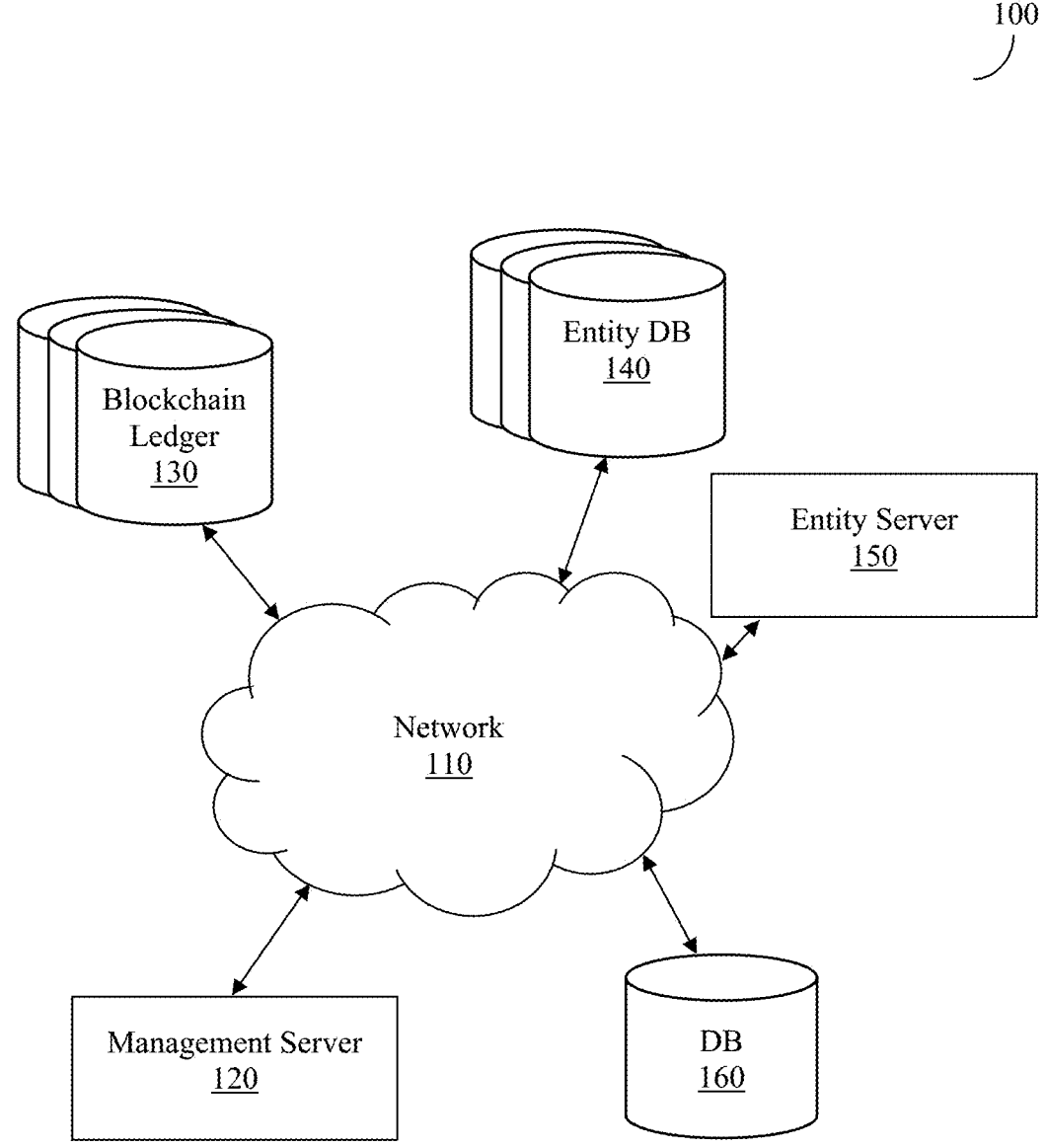
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

On-chain data as well as off-chain data is collected by a management server. The management server generates a cross-chain graph representation based on the collected on-chain and off-chain data. The cross-chain graph representation includes a plurality of nodes representing blockchain addresses and a plurality of edges representing transactions made between at least a portion of the plurality of nodes. The management server applies one or more machine learning (ML) models to the cross-chain graph representation to detect suspicious anomalies in the cross-chain graph representation. Upon determination that one or more suspicious anomalies have been detected in the cross-chain graph representation above a dynamic model-based threshold value, an action regarding detection of a security incident may be taken. In addition, a supervised ML model may be applied to the cross-chain graph representation for classifying the type of the security incident.

FIG. 1 shows an example network diagram 100 utilized to describe the various embodiments. In the example diagram 100, a management server 120, a digital blockchain ledger 130, an entity database 140 and an entity server 150 are communicatively connected to a network 110. The network 110 may be, but is not limited to, a wireless network, a wired network, a wide area network (WAN), local area network (LAN), or any other kind of applicable network, as well as any combination thereof.

The management server 120 may include hardware and software layers which enable the management server 120 to communicate with the different components connected to the network 110, collect data, generate graph representation, apply machine learning models to the graph representation, take actions regarding suspicious activities, execute corrective actions, and so on, as further described herein.

The blockchain ledger 130 is a digital storage used for storing therein a series of blocks on which transaction details are recorded after suitable authentication and verification by the designated network participants. It should be noted that one or more blockchain ledgers 130 may be accessed or used in order to execute the different embodiments of this disclosure.

The entity database (DB) 140 is a digital storage which may include data such as off-chain data of an entity such as an organization, a user and the like. The data stored in the entity DB 140 may include for example, business data, commissions paid by users when performing previous transactions, pending transactions (stored in a transaction memory pool), smart contracts data, and the like.

The entity server 150 is a computing device having a hardware and software layers that is configured to, among others, receive alerts from the management server 120, execute instructions sent from the management server 120, send data to the management server 120, and the like.

In an embodiment, the database 160 is a digital warehouse which may be utilized to store anomalous patterns, behavioral trends, failure predictions, machine learning models utilized for analyzing data, and a combination thereof.

Figure 2:
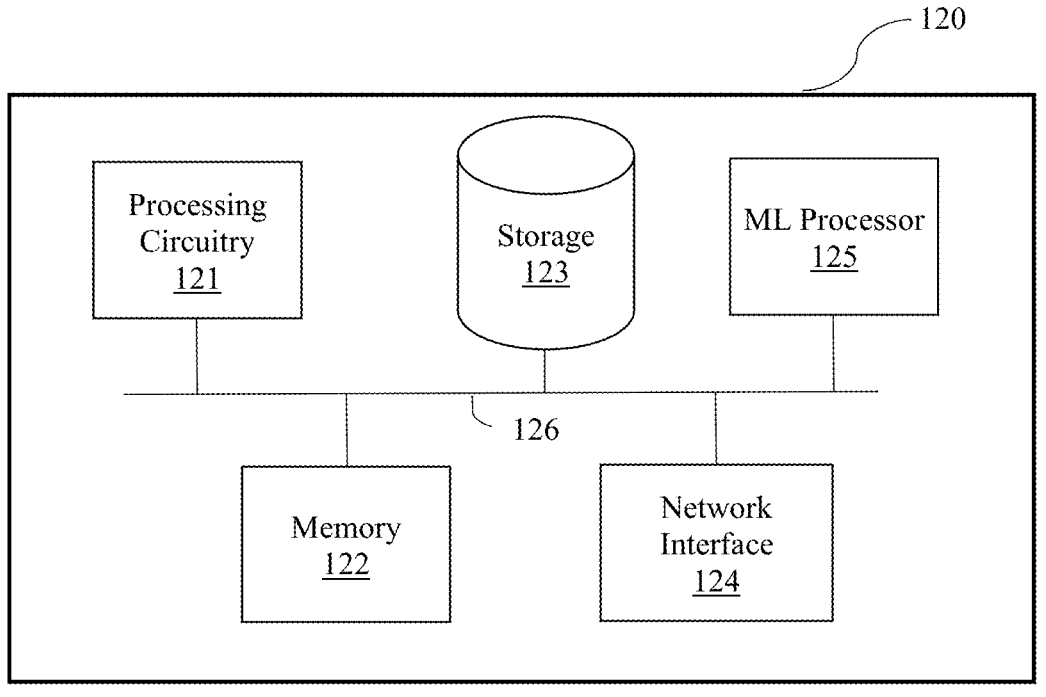
FIG. 2 is a schematic diagram of an illustrative management server 120 according to an embodiment.

FIG. 2 is a schematic diagram of an illustrative management server 120 according to an embodiment. The management server 120 includes a processing circuitry 121 coupled to a memory 122, a storage 123, a network interface 124 and a machine learning (ML) processor 125. In the embodiment, the components of the management server 120 may be communicatively connected via a bus 126.

The processing circuitry 121 may be realized as one or more hardware logic components and circuits. For example, and without limitation, illustrative types of hardware logic components that can be used, include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 122 may be volatile, e.g., RAM, etc.), non-volatile, e.g., ROM, flash memory, etc.), or a combination thereof. In one configuration, computer readable instructions to implement one or more embodiments disclosed herein may be stored in the storage 123.

In another embodiment, the memory 122 is configured to store software. Software shall be construed broadly to mean any type of instructions, whether referred to as software, firmware, middleware, microcode, or hardware description language. Instructions may include code in formats such as source code, binary code, executable code, or any other suitable format of code. The instructions, when executed by the one or more processing circuitry 121, cause the processing circuitry 121 to perform the various processes described herein.

The storage 123 may be magnetic storage, optical storage, and the like, and may be realized, for example, as flash memory or other memory technology, or any other medium which can be used to store the desired information.

The network interface 124 is configured to connect to a network. The network interface 124 may include, but is not limited to a wireless port, e.g., an 802.11 compliant Wi-Fi circuitry) configured to connect to a network. The network interface 124 allows the management server 120 to communicate with databases, other servers, and the like, such that the management server 120 can execute the embodiments discussed herein.

The machine learning processor 125 is configured to perform machine learning based on data received via the network interface 124 as described further herein. In an embodiment, the machine learning processor 125 is further configured to detect, based on one or more machine learning models that are applied to graph representation of the gathered data, security incidents in a blockchain ecosystem. In a further embodiment, and as further discussed herein, the machine learning processor 125 is also configured to detect the anomaly's type.

It should be understood that the embodiments described herein are not limited to the specific architecture illustrated in FIG. 2, and other architectures may be equally used without departing from the scope of the disclosed embodiments.

In an embodiment, the management server 120 collects from one or more electronic sources, e.g., the blockchain ledger(s) 130, on-chain data of a plurality of blockchain transactions occurred between a plurality of blockchain addresses. The on-chain data may include information regarding, blockchain addresses, blockchain wallets data, transaction identification, user information, device information, IP address, business type, smart contract related data, exchange or custodian, i.e., third party that stores digital assets for users, determination, and the like.

According to one embodiment, for the purpose of collecting on-chain data, the management server 120 may interface with a cryptocurrency exchange, also known as digital currency exchange (DCE), via a cryptocurrency exchange interface (not shown), so that on-chain data of a plurality of entities may be extracted and collected. It should be noted that the collected on-chain data may be collected from a plurality of blockchain networks.

In an embodiment, the management server 120 collects off-chain data of a plurality of entities, e.g., users, organizations, that were involved in one or more transactions that were recorded in one or more blockchain networks, e.g., Bitcoin, Ethereum, Solana, and the like. That is, each entity of the plurality of entities is associated with at least one blockchain transaction of the plurality of blockchain transactions. Each entity may be associated with a unique blockchain address, e.g., blockchain wallet. The off-chain data may be extracted from the entity database (DB) 140 and may include for example, business data, commissions paid by users when performing previous transactions, pending transactions (stored in a transaction memory pool), smart contracts data, and the like. Smart contracts are executable computer programs stored on a blockchain that run when predetermined conditions are met. They typically are used to automate the execution of an agreement so that all participants can be immediately certain of the outcome, without any intermediary's involvement or time loss. Smart contracts can also automate a workflow, triggering the next action when conditions are met.

In an embodiment, the management server 120 generates a cross-chain graph representation based on the collected on-chain and off-chain data. The cross-chain graph representation includes a plurality of nodes representing blockchain addresses and a plurality of edges representing the connections between at least a portion of the plurality of nodes. Each node may represent a user, a digital asset, e.g., smart contract, a transaction, a function, smart contract function, a cryptocurrency exchange, and the like. The edges represent the relationships between the nodes. The cross-chain graph representation provides with a structural representation of, for example, the entities' transactional behaviors, transactions' volume, transactions parties, reciprocity between the parties, timestamps, locations of parties of a transaction, and so on. It should be noted that the cross-chain graph representation may be a multidimensional graph. Also, it should be noted that the cross-chain graph representation includes a unified representation of transactional behavior that occurs within a plurality of blockchain networks, e.g., Bitcoin, Ethereum, Solana, and the like. To that end, the on-chain data and off-chain data is collected with respect to a plurality of blockchain networks. Thus, and as further described herein, a unified cross-chain graph representation is created and facilitates detection of suspicious transactional behavior in the blockchain ecosystem.

In an embodiment, the management server 120 applies one or more algorithms to the collected on-chain and off-chain data for creating the graph representation. Each node in the graph representation may represent a user wallet, a business wallet, and a smart contract. Each edge in the graph representation may represent the connection, e.g., the transaction amount, transaction timestamp, etc., between two addresses. The graph representation facilitates detection of anomalous activity in the blockchain ecosystem based on structural representation of different parameters' values. The parameters' values, e.g., transactions amounts, transaction dates, IP addresses, commission rates, etc., may be extracted from the collected on-chain and off-chain data.

That is, the management server 120 generates a cross-chain graph representation showing connections between parties to different blockchain transactions made in multiple blockchain networks. The data used for generating the cross-chain graph representation is collected with respect to multiple entities, e.g. organizations and users, on-chain transactions, off-chain transactions, and smart contracts.

By collecting data from multiple sources and with respect to many entities and transactions, a holistic graph representation is generated. The holistic graph representation may be used for determining a standard, or normal, blockchain transactional behavior between transaction parties. The standard blockchain transactional behavior may be used as a baseline for detecting deviation from the standard or normal transactional behavior. In an embodiment, the standard blockchain transactional behavior may be continuously adjusted based on market movements and transactional trends to reflect the normal cross-market transactional behavior. According to another embodiment, the management server 120 generates a graph representation with respect to each blockchain network based on the collected blockchain data of the plurality of blockchain transactions and the organization data of the plurality of entities.

In an embodiment, the management server 120 applies to the cross-chain graph representation a machine learning model that is adapted to detect anomalies in the cross-chain graph representation. There are several graph representation learning techniques that can deal with massive network data. Such techniques include, for example, graph convolutional networks, graph attention networks, and recurrent networks. As noted above, the cross-chain graph representation provides with a structural representation of, for example, the entities' transactional behaviors, transactions' volume, transactions parties, connections between the parties, transactions timestamps, locations of parties of a transaction, and so on. The structural representation consists of a network of nodes and edges as further discussed herein. The network of nodes and edges creates geometric shapes that, when analyzed using, for example, geometric anomaly detection algorithms, may be indicative to normal transactional behavior and abnormal transactional behavior.

One or more machine learning models, e.g., supervised, or unsupervised, may be used to detect anomalous nodes and anomalous edges in the blockchain ecosystem, e.g., one or more blockchain networks, based on the graph representation. It should be noted that anomalous nodes are a subset of nodes where every node in the subset has an irregular feature compared to other nodes in the graph.

In an embodiment, the management server 120 generates and assigns to each node an anomaly score based on the node's characteristics such as, the ratio of in degree/out degree, ego network density, and the like. Note that, as is well known, "ego network" refers to the subgraph of a larger network that is centered around a particular node called the ego node. The ego network includes the ego node and all of its immediate neighbors, called alters, as well as the edges connecting them. Essentially, it represents the local network surrounding a specific focal point which is the ego node. Such a subgraph enables a better understanding of the relationships and interactions within the local neighborhood about the ego node. In degree and out degree are, for each node, for example, respectively, the amount of incoming transfers or transactions into the node and the amount of outgoing transfers or transactions from the node The anomaly score represents the level of deviation of the node's behavior with respect to behavior of other nodes that were recorded in the blockchain ecosystem, e.g., cross-chain network. Similar to anomalous nodes, anomalous edges are a subset of edges where every edge exhibits abnormal behavior, i.e., having scores higher than a specific threshold. This characteristic, in turn, suggests the existence of an anomaly. In an embodiment, the management server 120 generates and assigns to each edge an anomaly score based on the edge's characteristics such as, the transaction amount, timestamp, and the like. It should be noted that an anomaly may be detected based on collecting data with respect to one or more of the following parameters: user activity, funding (potential setup phase for attack), deployment of malicious contract by hacker (part of the attack preparation) external calls from blacklist users, function calls, administration transactions, transaction values, gas prices, and so on.

After modeling the one or more blockchain transactions networks as a graph, representations of nodes using data related to those nodes, which may be extracted with respect to each node from sources such as, a local database, database located in a cloud, which may be a public or hybrid cloud, and the like, are created using a set of features that are fused with learned node representations. A set of features is extracted with respect to each node. The features consisting of several categories such as, (a) structural features, which consist of in degree and out degree; (b) transactional features, which are based on the characteristics related to the amount and time interval of the transactions; (c) regional features, which are defined as the ego network of a node; (d) neighborhood features; that are based on the aggregated characteristics of neighbors of the ego node, and the like. The features may be used by the machine learning model to detect anomalies.

According to one embodiment, a supervised machine learning model may be trained based on labelled input and output training data indicating normal transactional behavior and abnormal transactional behavior, normal and abnormal wallets' features, normal and abnormal smart contracts' features, and so on. To that end, the DB 160 may store therein labelled inputs and outputs training data, such as but not limited to, one or more graph representations of blockchain transactions and relationships between different parties, e.g., users and entities, showing labelled normal transactional patterns and labelled abnormal transactional patterns, features related to wallets and smart contracts, and the like. In an embodiment, the ML processor 125 is configured to perform machine learning based on the labelled training data and the authentic graph representation of the on-chain data, and optionally the off-chain data. The ML processor 125 is further used for detecting anomalies in one or more graph representations of blockchain networks based on the training data.

In an embodiment, the ML processor 125 may be configured to determine the type of a suspicious security incident that has been detected in the cross-chain graph representation using a supervised machine learning model. To that end, a supervised machine learning model may be trained based on labelled input and output training data indicating security incident's types, such as but not limited to, access control, smart contract exploit, eclipse attack, private key leakage, fraud, and the like.

According to further embodiment, an unsupervised machine learning model may be trained based on unlabeled training data to detect anomalies associated with transactional behavior, wallets, smart contracts, and the like. To that end, the DB 160 may store therein unlabeled training dataset, such as, one or more graph representations of authentic blockchain transactions and relationships between different parties, e.g., users and entities, showing unlabeled transactional patterns, unlabeled wallets, including wallets' features, smart contracts, including smart contracts' features, and the like. In an embodiment, the ML processor 125 is configured to perform machine learning based on the authentic graph representation that is based on the on-chain data, and optionally the off-chain data. The ML processor 125 is further used for detecting anomalies in one or more graph representations of blockchain networks based on the unlabeled training dataset.

In an embodiment, the management server 120 applies a graph-based anomaly detection (GBAD) algorithm that is designed to detect different anomalies in the cross-chain graph representation. Such algorithm may detect anomalies in various networks by capturing anomalous nodes, anomalous edges, subgraphs, and events. Also, feature engineering and graph representation learning, also called graph embedding, techniques may be used to embed the structural representation of a graph into a vector space, or feature space, in which the machine learning models are then built. Graph representation learning extracts structural information from networks without the need for experts' knowledge and traditional feature engineering and can be adapted to learn and capture rich spatial metadata of time-evolving networks. The graph representation learning enables graph-based machine learning, network-driven anomaly detection, and insightful visualization.

In an embodiment, the management server 120 applies graph neural network (GNN) model to the graph representation to extract data and detect anomalies at the node-level, edge-level, and graph-level. The GNN model may include for example graph convolutional network (GCN), graph attention network (GAT), gated graph neural network (GGNN).

In an embodiment, upon determination that one or more suspicious anomalies have been detected above a dynamic model-based threshold value in the cross-chain graph representation, the management server 120 may take or cause an action to be taken regarding the at least one security incident in the blockchain ecosystem. As an example, the dynamic model-based threshold may indicate that at least five anomalies should be gathered with respect to a single entity in a predetermined time frame in order to cross the threshold. As another example, the dynamic model-based threshold may indicate that at least ten anomalies should be gathered with respect to two or more entities in a predetermined time frame in order to cross the dynamic model-based threshold. As another example, the dynamic model-based threshold may indicate that a single anomaly may be sufficient in order to cross the threshold. In an embodiment, upon determination that the dynamic model-based threshold value was not crossed, the management server 120 continuously searches for suspicious anomalies in the cross-chain graph representation using the ML processor 125.

According to one embodiment, upon determination that one or more suspicious anomalies have been detected above a dynamic model-based threshold value in the cross-chain graph representation, the management server 120 interfaces with the entity server 150 to initiate an action. For example, management server 120 may cause the entity server 150 to automatically initiate a corrective action. An example of the corrective action may be activation of a replace by fee (RBF) mechanism. The RBF is a mechanism that allows replacement of a first version of an unconfirmed transaction with a second version of the transaction that pays a higher transaction fee. By doing so the second transaction overrides the first unconfirmed transaction such that the first unconfirmed transaction is abandoned, and the second transaction enters the queue at the transaction memory pool. In another example, the corrective action may be achieved by manipulating one or more smart contracts to perform one or more actions in order to prevent an attack. As yet a further example, the corrective action may be achieved using a blockchain oracle that may be controlled by the management sever 120 and used to prevent hackers' attacks.

According to another embodiment, the action may be for the management server 120 to generate an alert indicating at least one security incident in the blockchain ecosystem. The management server 120 sends the alert by the network interface 124 to the entity server 150. The alert may include details regarding the suspicious security incident detected in the blockchain ecosystem, such as, transaction amount, timestamp, and the like. Thus, according to this embodiment, the alert may be handled by a human, e.g., security officer.

It should be noted that one or more actions may be simultaneously executed by the management sever 120. That is, upon determination that one or more suspicious anomalies have been detected above the dynamic model-based threshold value in the cross-chain graph representation, the management server 120 may cause the entity server 150 to automatically initiate a corrective action and may simultaneously send an alert to the entity server 150.

The system and methods disclosed herein provide a solution which enables real-time detection, classification, and prevention of security incidents in a blockchain ecosystem. More specifically the disclosed solution provides a reliable real-time solution for detecting and preventing security incidents in decentralized finance (DeFi) protocols, crypto exchanges, custodians, and the like.

FIG. 3 is a flowchart describing an illustrative method for real-time detection of security incidents in a blockchain environment, according to an embodiment. The disclosed method may be executed by the management server of FIG. 2.

At S310, on-chain data of a plurality of blockchain transactions occurred between a plurality of blockchain addresses is collected. The blockchain data may be collected from one or more sources. The on-chain data may include information regarding, blockchain addresses, transaction identification, user information, device information, IP address, business type, smart contract related data, exchange or custodian, i.e., third party that stores digital assets for users, determination, and the like.

At S320, off-chain data of a plurality of entities is collected. Each entity of the plurality of entities is associated with a unique blockchain address.

At S330, a cross-chain graph representation is generated based on the collected on-chain data, off-chain data and smart contracts data. The cross-chain graph representation includes a plurality of nodes representing blockchain addresses, e.g., wallets and smart contracts, and a plurality of edges representing the connections, e.g., transactions, between at least a portion of the plurality of nodes.

At S340, a machine learning model is applied to the cross-chain graph representation. The machine learning model that is adapted to detect suspicious anomalies in the cross-chain graph representation.

At S350, an action is performed regarding an illicit activity in the blockchain ecosystem when one or more suspicious anomalies have been detected in real-time in the cross-chain graph representation above a dynamic model-based threshold, the types of actions that may be taken are indicated hereinabove. For example, the action taken may be sending an alert indicating the illicit activity in the blockchain ecosystem to a predetermined server. The alert may include a report regarding the security incident that occurred in the blockchain ecosystem.

It should be noted that upon determination that the dynamic model-based threshold value was not crossed, a search for suspicious anomalies in the cross-chain graph representation is performed continuously.

Figure 4:
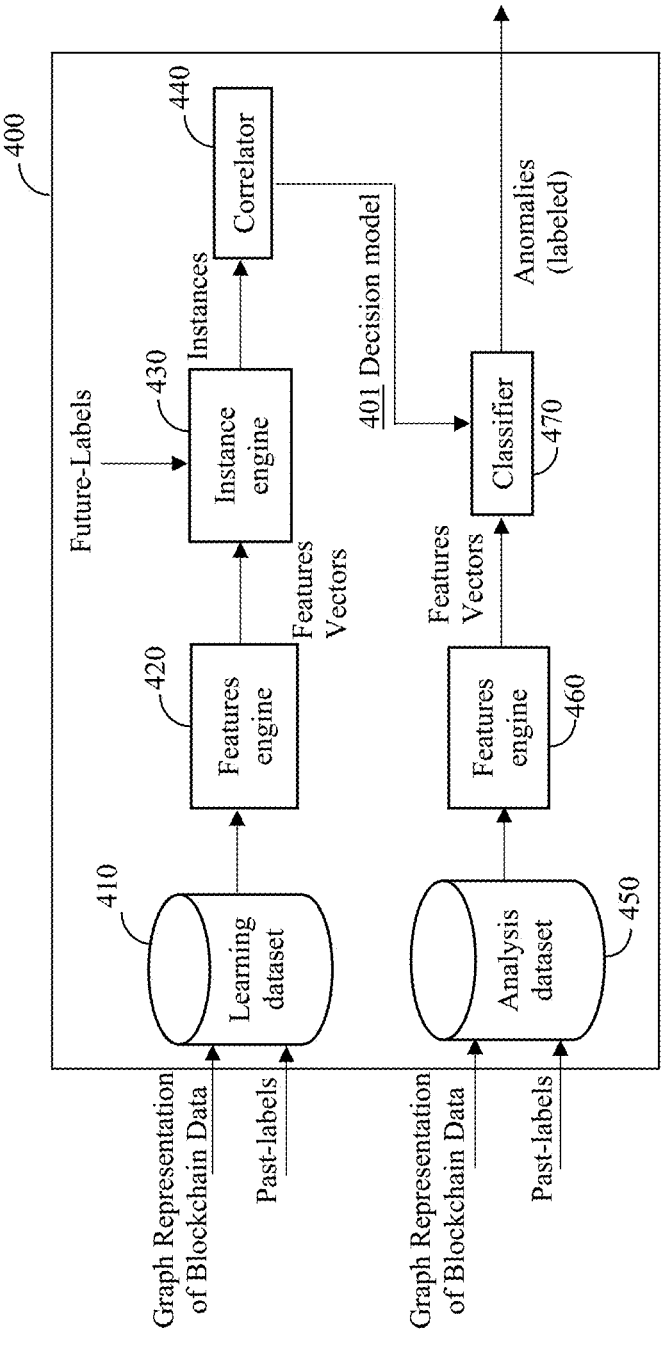
FIG. 4 is a schematic diagram of an illustrative supervised machine learning module utilized to detect anomalies in a graph representation of blockchain ecosystem, according to an embodiment.

FIG. 4 is a schematic diagram of an illustrative supervised machine learning module 400 utilized to detect anomalies in a graph representation of blockchain ecosystem, according to an embodiment.

The module 400 operates in two phases: learning and analysis. In the learning phase, a decision model 401 is trained and supplied to classifier 170 for its use, while in the analysis phase, the decision model 401 is utilized for detecting anomalies in the cross-chain graph representation. In each phase, different datasets and processes are utilized.

In the learning phase, graph representation of on-chain data and off-chain data, received from various sources, is aggregated, and saved as a learning dataset 410. The graph representation saved in the learning dataset 410 may be labeled indicating, for example, previously detected anomalies associated with different types of anomalies in the blockchain environment.

The learning dataset 410 is connected to a feature engine 420 configured to generate a features vector for each node, e.g., wallet, smart contract, user, entity, transaction, in the graph representation. A features vector may be based on a set of features characterizing each node including, but not limited to, financial data related to each node. The features may include, but are not limited to, transactions attributes, e.g., transaction amount, dates, liquidity, smart contract parameters, blacklist exposure, commissions paid by entity, and so on.

In an embodiment, to generate a features vector, the aggregated and labelled graph representation of on-chain data, off-chain data and smart contracts data, is analyzed, and the relevant features are extracted therefrom. As an example, attributes of the transactions are extracted from the blockchain ledger, a blacklist exposure, and the like. It should be noted that some addresses or accounts may be related to malicious activity and therefore appear in a "blacklist" which is a list of addresses the system has already marked as problematic addresses. Such lists may be extracted from a database of a digital currency exchange.

An instance engine 430 is configured to produce an instance, which is an indication of an anomaly, in the cross-chain graph representation by labeling the respective features vector with future-labels. The future-labels are labels generated at a time later than the past-labels, i.e., the past-labels included in the learning dataset 410. Therefore, each instance is a pair including a features vector and a label, e.g., indicating an anomaly, at a given time. The features vector represents an input to an instance engine 430, and the label is a desired output value of the classifier 470, e.g., when it sees the same or a similar feature vector. The instances of anomalies to be detected are input to the correlator 440.

In an embodiment, the correlator 440 is configured to implement a supervised machine learning algorithm for analyzing instances and generating a trained decision model which is supplied to classifier 470 for its use. Examples for the supervised machine learning algorithm include support vector machine (SVM), Logistic Regression, Gradient Boosted Decision Trees, and/or the like. The decision model, generated by the correlator 440, is used to map or correlate unseen vectors, i.e., set of features representing an anomaly that have not yet been identified as an anomaly, to the labels indicating an anomaly. The unseen vectors are analyzed during the analysis phase.

In an embodiment, during the analysis phase, graph representation of on-chain data, off-chain data and smart contracts data, is retrieved from the analysis dataset 450. The dataset 450 includes graph representation of on-chain data, off-chain data, and smart contracts data gathered over time. Labels in the dataset 450 are neither past-labels nor future-labels used during the learning phase.

The analysis dataset 450 is input for the feature engine 460. The features engine 460 is configured to generate a features vector for anomalous behavior in the blockchain environment. A features vector is based on a set of features representing an anomaly.

The generated features vectors are fed to the classifier 470. The classifier 470 is configured to output a decision labeling for anomalies. The labeling is based on the decision model 401 and the features vector of a respective node in the graph representation. The classifier 470 can be implemented using known classifying techniques utilized in the supervised machine learning. For example, the classifier 470 can be implemented as a boosted tree, a random forest, and the like of other decision or classification trees. In an embodiment, by identifying a known sequence, cluster or group of anomalies, the module 400 may be configured to determine a type of the security incident characterized by, for example, the group of anomalies. The security incident types may be, for example and without limitation, access control, smart contract exploit, eclipse attack, private key leakage, and the like.

In an example embodiment, any of the feature engines 420 and 460, the instance engine 430, the correlator 440, and the classifier 470, can be realized by one or more hardware logic components, circuits, or both. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information.

The datasets 410 and 450 can be stored in a memory, which can be volatile, e.g., RAM, etc.) memory, non-volatile, e.g., ROM, flash memory, etc.) memory, or a combination thereof. Alternatively or collectively, the datasets 410 and 450 can be stored in a storage, such as a magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

Figure 5:
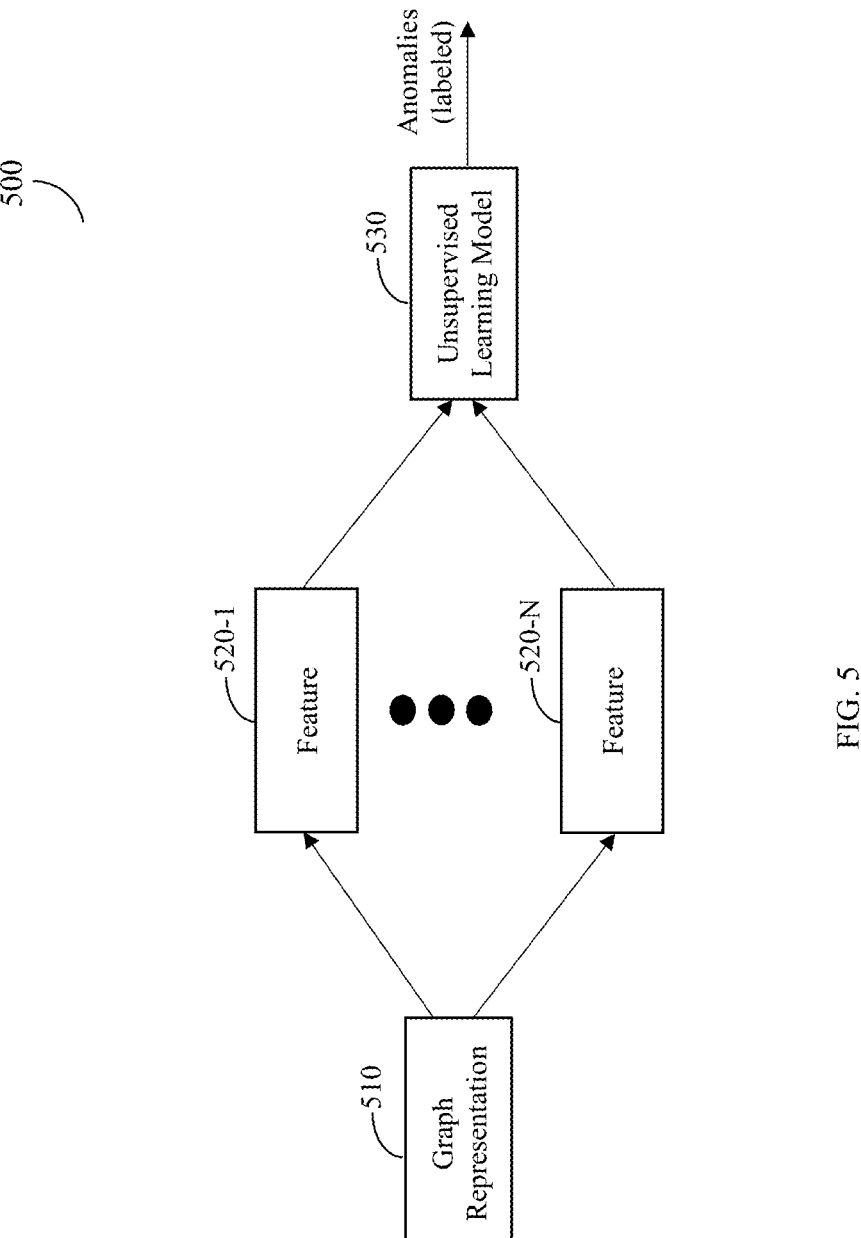
FIG. 5 is a schematic diagram of an illustrative unsupervised machine learning module utilized to detect anomalies in a graph representation of blockchain ecosystem, according to an embodiment.

FIG. 5 is a schematic diagram of an illustrative unsupervised machine learning module 500 utilized to detect anomalies in a graph representation of a blockchain ecosystem, according to an embodiment.

The module 500 receives a cross-chain graph representation that is generated based on raw data of on-chain data, off-chain, and smart contracts data. The cross-chain graph representation includes a plurality of nodes representing blockchain addresses and a plurality of edges representing transactions made between at least a portion of the plurality of nodes.

The module 500 receives a set of features, e.g., the features 520-1 through 520-N, for data extraction. The features may include for example, (a) structural features, consisting of, for example, in degree and out-degree, which in this case may be the number of incoming and outgoing transactions of all nodes; (b) transactional features, which enable investigating characteristics related to the amount and time interval of the transactions; (c) regional features, which are defined as the ego network of a node; and (d) neighborhood features, which represent the aggregated characteristics of neighbors of the node, and the like.

Based on the graph representation 510, the module 500 performs feature extraction to generate data associated with feature 1 through feature N. Then, the module 500 inputs the features into an unsupervised learning model 530, which assigns a label to the data.

An unsupervised learning classifier may be configured to output a decision labeling for anomalies. Unsupervised learning classifiers for the model 530 may include, but are not limited to, k-means clustering, nearest neighbor, anomaly detection, artificial neural networks, expectation-maximization algorithms, principal component analysis, and/or a combination thereof.

FIG. 6 is an illustrative diagram illustrating a graph representation of a blockchain ecosystem, according to an embodiment. It should be noted that while the diagram 600 showing a graph representation of a cross-chain network for at least two blockchain networks, such graph representation may also depict a single blockchain network. The example graph representation includes nodes, such as the node 615, that are shown as points or circles and edges, such as the edge 620, that are shown as lines connecting the nodes. Each node represents a user wallet, a business wallet, smart contract and the like. Each edge represents the connection, e.g., transaction, between two nodes. The connection may be indicative to, for example, a transaction amount, timestamp, and the like.

As noted above with respect to FIG. 2, on-chain data, off-chain data, and smart contracts data are collected in order to form the graph representation of the blockchain ecosystem. After modeling the blockchain transactions network(s) as a graph, nodes representations are created using a set of features that are fused with learned node representations. A set of features is extracted with respect to each node. The features consisting of several categories, such as but not limited to, (a) structural features, consist of in degree and out-degree; (b) transactional features, which investigate the characteristics related to the amount and time interval of the transactions; (c) regional features, which are defined as the ego network of a node; and (d) neighborhood features which analyze the aggregated characteristics of neighbors of the node.

In an embodiment, each node is assigned with an anomaly score based on its characteristics such as, the ratio of input/output degree and ego net density, and the like. The anomaly score represents the level of deviation of the node's behavior from other nodes' behavior recorded in the blockchain environment, e.g., cross-chain network. Similar to anomalous nodes, anomalous edges are a subset of edges where every edge exhibits abnormal behavior, i.e., having scores higher than a specific threshold. This characteristic, in turn, suggests the existence of an anomaly.

As an example, the node 615 is classified as an anomalous node in the cross-chain network that is shown in diagram 600. It should be noted that an anomaly score is generated and associated with the node 615 and with the edges related thereto, such that a determination of whether to perform an action based on the detected anomaly or anomalies, can be made. According to the same example, the node 615 is classified as a suspicious node having an anomaly score of 90 out of 100. The anomaly score is determined based on analysis of the following example features: structural features (consist of in degree and out-degree), transactional features (investigate the characteristics related to the amount and time interval of the transactions), regional features (the ego network of a node), neighborhood features (aggregated characteristics of neighbors of the node). According to the same example, the structural features indicate that the number of in degree and out-degree related to the node 615 is relatively high compared to other nodes in the cross-chain network and the characteristics related to the amount and time interval of the transactions (transactional features) are also different, e.g., relatively high, compared to other monitored transactions made in the cross-chain network.

Figure 7:
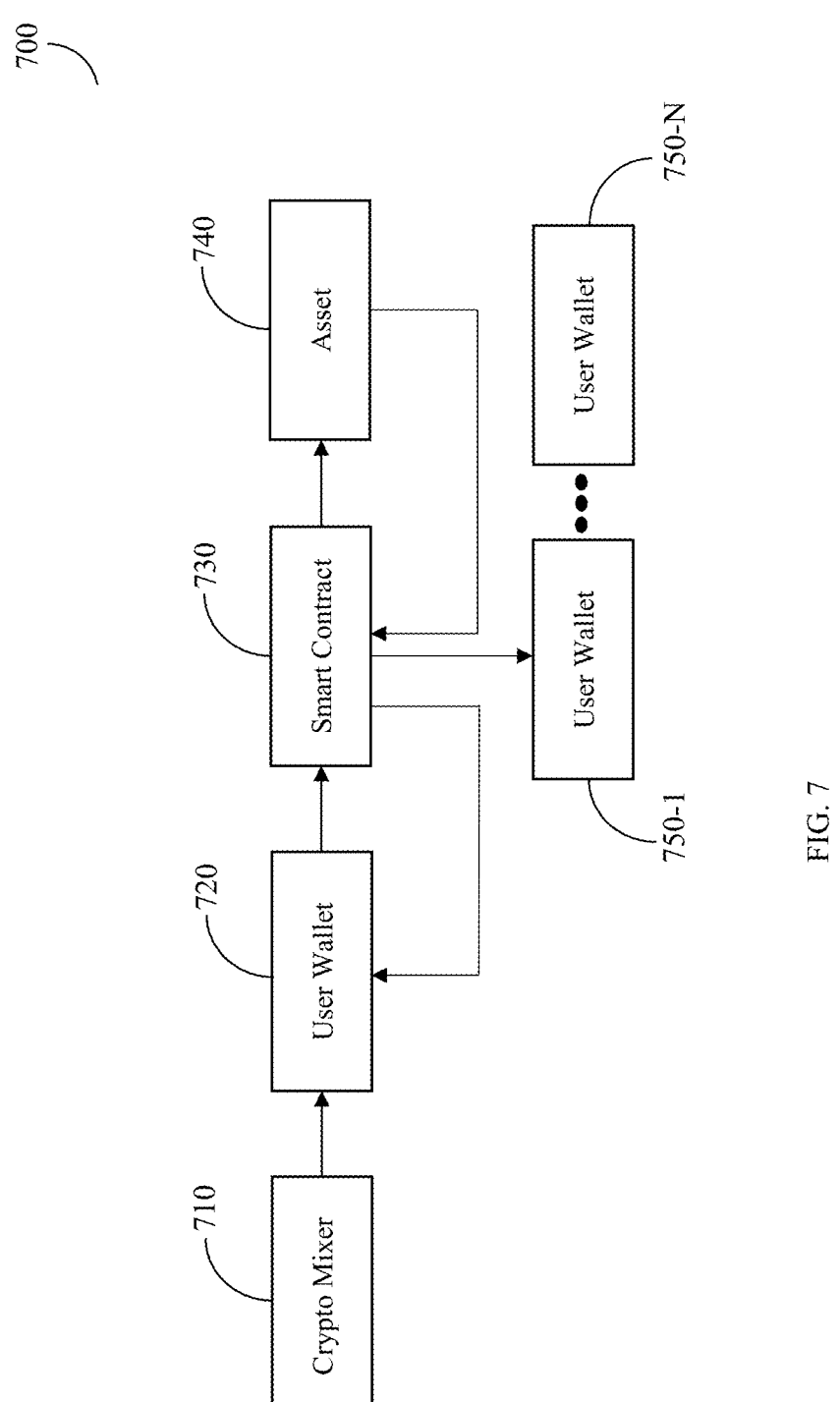
FIG. 7 is a block diagram illustrating an illustrative suspicious anomalous behavior in the blockchain ecosystem, according to an embodiment.

FIG. 7 depicts a block diagram 700 illustrating an illustrative suspicious anomalous behavior in the blockchain ecosystem, according to an embodiment. The example scenario introduced in diagram 700 shows a sequence of actions that may be indicative of anomalous activity in the blockchain ecosystem.

In the example diagram 700 funding is received at a user's wallet 720 from a crypto mixer 710. A crypto mixer is a service that blends the cryptocurrencies of many users together to obfuscate the origins and owners of the funds. It should be noted that the user may send funds to its own wallet using the mixer. After funding is received at the user's wallet 720, the user, i.e., potential hacker, creates a smart contract 730 that is configured to exploit vulnerabilities of an asset, e.g., another smart contract, 740. As a result, the asset 740 sends funds to the smart contract 730 created by the user, i.e., hacker, and the smart contract 730 is configured to send the funds back to the user's, i.e., hacker, wallet 720. It should be noted that a hacker may use several wallets, such as the wallet 720, to execute attacks. Thus, according to another embodiment, after the asset 740 sends funds to the smart contract 730, the smart contract 730 may be configured by the hacker to send the funds to one or more wallets such as the wallet 750-1 through wallet 750-N of the hacker.

Each of the actions, i.e., transactions, shown in diagram 700 may be detected and recorded using the management server, e.g., of FIG. 2. Also, data regarding the involved entities and assets is collected and used for analyzing the sequence of actions and for creating the graph representation, e.g., of FIG. 6. Thus, for example, the identity of the mixer 710 is detected as Tornado Cash. The timestamp at which the funding was initially received at the user's wallet 720 indicates the exact date and time of the transaction. The timestamp at which the smart contract 730 is initially created is also identified. In addition, the timestamp at which the asset 740 sent the funds to the smart contract 730, as well as data regarding the amounts of the transaction, is collected. Moreover, the timestamp at which the smart contract 730 sent the funds to the user's wallet 720, as well as transactional data is also collected and recorded.

It should be noted that the example sequence of actions shown in diagram 700 may create a suspicious geometric structure when implemented in the graph representation. Thus, the geometric structure of the example scenario may be indicative of an anomalous transactional behavior that may be indicative of a security incident, as further discussed herein. It should be noted that each block shown in the diagram 700 may be represented as a node in the graph representation that is further discussed herein.

There may be several indicators that may be indicative of suspicious behavior in the example diagram 700. For example, the number of transactions that were previously made by a user is low as compared to current user's activity, the identity of the crypto mixer, a single transaction made by a user significantly increases the user's balance, a single transaction made by a user significantly decreases the asset's, e.g., wallet, balance, a user receiving funds from its own smart contract, and the like.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method for real-time detection of security incidents in a blockchain ecosystem, the method comprising:

collecting, by a management server, from one or more electronic sources on-chain data of a plurality of blockchain transactions occurred between a plurality of blockchain addresses;

collecting, by the management server, off-chain data of a plurality of entities, wherein each entity of the plurality of entities is associated with at least one blockchain transaction of the plurality of blockchain transactions;

generating, by the management server, a cross-chain graph representation based on at least the collected on-chain data of the plurality of blockchain transactions and the off-chain data of the plurality of entities, wherein the cross-chain graph representation includes a plurality of nodes representing blockchain addresses and a plurality of edges representing connections between at least a portion of the plurality of nodes;

applying, by the management server, to the cross-chain graph representation a machine learning model that is adapted to detect suspicious anomalies in the cross-chain graph representation; and when one or more suspicious anomalies have been detected above a dynamic model-based threshold value in the cross-chain graph representation, instigating, in real-time, the taking of an action regarding detection of a security incident.

2. The method of claim 1, wherein the off-chain data comprises at least smart contracts data.

3. The method of claim 1, wherein each entity of the plurality of entities is associated with a unique blockchain address.

4. The method of claim 1, wherein the action instigated is causing a predetermined server to automatically initiate a corrective action.

5. The method of claim 1, wherein the action comprises:

sending, by the management server, an alert indicating at least one security incident has occurred to a predetermined server.

6. The method of claim 5, wherein the alert comprises at least a detailed report regarding the at least one security incident.

7. The method of claim 1, further comprising:

generating an anomaly score for each node of the plurality of nodes.

8. The method of claim 1, further comprising:

generating an anomaly score for each edge of the plurality of edges.

9. The method of claim 1, further comprising:

when the dynamic model-based threshold value is not crossed, continuously searching by the management server for suspicious anomalies in the cross-chain graph representation.

10. The method of claim 1, wherein the cross-chain graph representation includes a unified representation of transactional behavior that occurs within a plurality of blockchain networks from which the plurality of blockchain transactions are collected.

11. The method of claim 1, wherein the of nodes and edges of the cross-chain graph representation form geometric shapes and wherein, in the applying step further comprises the machine learning model analyzing the geometric shapes using geometric anomaly detection analysis to detect the suspicious anomalies.

12. A system for real-time detection of illicit activity in a blockchain environment, comprises:

a processing circuitry; and a memory, the memory containing instructions that, when executed by the processing circuitry, configure the system to:

collect from one or more electronic sources on-chain data of a plurality of blockchain transactions occurred between a plurality of blockchain addresses;

collect off-chain data of a plurality of entities, wherein each entity of the plurality of entities is associated with at least one blockchain transaction of the plurality of blockchain transactions;

generate a cross-chain graph representation based on at least the collected on-chain data of the plurality of blockchain transactions and the off-chain data of the plurality of entities, wherein the cross-chain graph representation includes a plurality of nodes representing blockchain addresses and a plurality of edges representing connections between at least a portion of the plurality of nodes;

apply to the cross-chain graph representation a machine learning model that is adapted to detect suspicious anomalies in the cross-chain graph representation; and when one or more suspicious anomalies have been detected above a dynamic model-based threshold value in the cross-chain graph representation, instigate, in real-time, the taking of an action regarding detection of a security incident.

13. The system of claim 12, wherein the off-chain data comprises at least smart contracts data.

14. The system of claim 12, wherein each entity of the plurality of entities is associated with a unique blockchain address.

15. The method of claim 12, wherein the action instigated is causing a predetermined server to automatically initiate a corrective action.

16. The method of claim 12, wherein the action comprises:

send an alert indicating at least one security incident has occurred to a predetermined server.

17. The method of claim 16, wherein the alert comprises at least a detailed report regarding the at least one security incident.

18. The method of claim 12, wherein the system is further configured to:

generate an anomaly score for each node of the plurality of nodes.

19. The method of claim 12, wherein the system is further configured to:

generate an anomaly score for each edge of the plurality of edges.

20. The method of claim 12, wherein the system is further configured to:

continuously search by the management server for suspicious anomalies in the cross-chain graph representation when the dynamic model-based threshold value is not crossed.

\* \* \* \* \*